(12) United States Patent
An et al.

(10) Patent No.: US 11,801,845 B2
(45) Date of Patent: Oct. 31, 2023

(54) APPARATUS AND METHOD FOR CONTROLLING ALCOHOL INTERLOCK OF VEHICLE

(71) Applicants: Hyundai Motor Company, Seoul (KR); Kia Motors Corporation, Seoul (KR)

(72) Inventors: Dae Yun An, Gyeonggi-do (KR); Gyun Ha Kim, Incheon (KR); Eung Hwan Kim, Seoul (KR); Sang Kyung Seo, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 249 days.

(21) Appl. No.: 17/101,864

(22) Filed: Nov. 23, 2020

(65) Prior Publication Data

US 2022/0009503 A1 Jan. 13, 2022

(30) Foreign Application Priority Data

Jul. 13, 2020 (KR) ........................ 10-2020-0086378

(51) Int. Cl.
 *B60W 40/08* (2012.01)
 *B60K 28/02* (2006.01)
 *G06V 20/05* (2022.01)
(52) U.S. Cl.
 CPC ............ *B60W 40/08* (2013.01); *B60K 28/02* (2013.01); *G06V 20/05* (2022.01); *B60W 2420/42* (2013.01); *B60W 2540/24* (2013.01)

(58) Field of Classification Search
 CPC ............. B60W 40/08; B60W 2420/42; B60W 2540/24; G06V 20/59; B60K 28/02
 See application file for complete search history.

(56) References Cited

U.S. PATENT DOCUMENTS

| | | | |
|---|---|---|---|
| 10,894,546 B2* | 1/2021 | Vanhelle | B60W 40/08 |
| 11,161,409 B1* | 11/2021 | Ghannam | H04L 9/3239 |
| 11,364,801 B2* | 6/2022 | Chen | B60W 50/14 |
| 2016/0272214 A1* | 9/2016 | Chen | B60K 28/06 |
| 2020/0338980 A1* | 10/2020 | Chen | B60W 50/14 |
| 2021/0101482 A1* | 4/2021 | Seo | B60K 28/063 |

(Continued)

OTHER PUBLICATIONS

Jongshill Lee et al., "Personal Identification Based on Vectorcardiogram Derived from Limb Leads Electrocardiogram", Journal of Applied Mathematics 2012.

(Continued)

*Primary Examiner* — Peter D Nolan
*Assistant Examiner* — Wae L Louie
(74) *Attorney, Agent, or Firm* — Fox Rothschild LLP

(57) ABSTRACT

An alcohol interlock control apparatus for a vehicle includes: a sensor configured to acquire a biosignal of an occupant that is seated in a driver's seat; and a controller configured to determine whether or not the occupant seated in the driver's seat has changed based on the biosignal of the occupant, and when changed, to determine whether the occupant is in a drunken state, and may identify a driver based on the biosignal of the occupant seated in the driver's seat without an additional device and cost, and may fundamentally block an improper alcohol measurement of an additional occupant instead of the driver.

16 Claims, 8 Drawing Sheets

(56) References Cited

U.S. PATENT DOCUMENTS

| | | | |
|---|---|---|---|
| 2021/0362594 A1* | 11/2021 | Mohana | G08B 21/182 |
| 2021/0403017 A1* | 12/2021 | Bielby | G06N 3/08 |
| 2022/0009503 A1* | 1/2022 | An | B60K 28/02 |
| 2022/0172527 A1* | 6/2022 | Kim | A61B 5/18 |

OTHER PUBLICATIONS

Zahhad et al., "Biometric authentication based on PCG and ECG signals: present status and future directions", Signal, Image and Video Processing, 2013.

\* cited by examiner

APPARATUS AND METHOD FOR CONTROLLING ALCOHOL INTERLOCK OF VEHICLE

CROSS-REFERENCE TO RELATED APPLICATION

This application claims under 35 U.S.C. § 119(a) the benefit of Korean Patent Application No. 10-2020-0086378, filed in the Korean Intellectual Property Office on Jul. 13, 2020, the entire contents of which are incorporated herein by reference.

BACKGROUND

(a) Technical Field

The present disclosure relates to an alcohol interlock control apparatus for a vehicle and an alcohol interlock control method.

(b) Description of the Related Art

Recently, an alcohol interlock device has been developed to measure an alcohol content in an exhalation of a driver who boards a vehicle in order to stop operation of the vehicle when the alcohol content is detected above a certain level.

A general alcohol interlock device cannot distinguish whether an introduced expiration is an exhalation of the driver or an exhalation of a passenger, and when the exhalation of the passenger who is in a non-drunken state is introduced instead of the exhalation of the driver who is in a drunken state, the alcohol content above a certain level is not detected, and thus operation of the vehicle may be maintained. Therefore, even when the driver is in the drunken state, a running state of the vehicle is maintained, so that it is difficult to fundamentally prevent drunken driving by the driver.

The above information disclosed in this Background section is only for enhancement of understanding of the background of the disclosure, and therefore it may contain information that does not form the prior art that is already known in this country to a person of ordinary skill in the art.

SUMMARY

The present disclosure provides an alcohol interlock control apparatus and an alcohol interlock control method, capable of fundamentally blocking drunken driving by an occupant by accurately measuring an alcohol content in an exhalation that is introduced in a state where the occupant is seated in a driver's seat.

The technical objects of the present disclosure are not limited to the objects mentioned above, and other technical objects not mentioned can be clearly understood by those skilled in the art from the description of the claims.

An exemplary embodiment of the present disclosure provides an alcohol interlock control apparatus for a vehicle including: a sensor configured to acquire a biosignal of an occupant that is seated in a driver's seat; and a controller configured to determine whether or not the occupant seated in the driver's seat has changed based on the biosignal of the occupant, and when changed, to determine whether the occupant is in a drunken state.

The controller may measure an alcohol content of the occupant when the biosignal of the occupant is acquired, and may determine whether or not the occupant is in the drunken state based on the measured alcohol content.

The controller may determine whether the occupant seated in the driver's seat has changed when it is determined that the occupant is in a non-drunken state.

The controller may determine whether driving has started within a predetermined time after determining that the occupant is in the non-drunken state.

The controller may determine whether the occupant seated in the driver's seat has changed when it is determined that the driving has not started within the predetermined time and there is an additional occupant.

The controller may control a vehicle to start driving when the occupant seated in the driver's seat is not changed.

The controller may determine whether a condition for reconfirming the occupant seated in the driver's seat is satisfied after the vehicle starts driving and when satisfied, may control the biosignal of the occupant seated in the driver's seat to be re-measured.

The controller may compare the biosignal of the occupant seated in the driver's seat with a biosignal of an occupant previously stored, when they are different based on a comparison result thereof, may determine that the occupant seated in the driver's seat has changed, and may control the alcohol content of the occupant seated in the driver's seat to be re-measured.

The controller may control an interlock when it is determined that the occupant is in the drunken state based on a re-measurement result of the alcohol content.

The controller may update driver information based on the re-measured biosignal of the occupant when it is determined that the occupant is not in the drunken state based on a re-measurement result of the alcohol content.

An exemplary embodiment of the present disclosure provides an alcohol interlock control method including: acquiring, by a sensor, a biosignal of an occupant that is seated in a driver's seat; and determining, by a controller, whether or not the occupant seated in the driver's seat has changed based on the biosignal of the occupant, and when changed, determining whether the occupant is in a drunken state.

The method may further include measuring an alcohol content of the occupant when the biosignal of the occupant is acquired, and determining whether or not the occupant is in the drunken state based on the measured alcohol content.

Whether the occupant seated in the driver's seat has changed may be determined when it is determined that the occupant is not in the drunken state.

Whether driving has started within a predetermined time may be determined after determining that the occupant is in the non-drunken state.

Whether the occupant seated in the driver's seat has changed may be determined when it is determined that the driving has not started within the predetermined time and there is an additional occupant.

A vehicle to start driving may be controlled when the occupant seated in the driver's seat is not changed.

Whether a condition for reconfirming the occupant seated in the driver's seat is satisfied may be determined after the vehicle starts driving and when satisfied, the biosignal of the occupant seated in the driver's seat may be controlled to be re-measured.

The biosignal of the occupant seated in the driver's seat may be compared with a biosignal of an occupant previously stored, when they are different based on a comparison result thereof, it may be determined that the occupant seated in the driver's seat has changed, and the alcohol content of the occupant seated in the driver's seat may be controlled to be re-measured.

An interlock may be controlled when it is determined that the occupant is in the drunken state based on a re-measurement result of the alcohol content.

Driver information may be updated based on the re-measured biosignal of the occupant when it is determined that the occupant is not in the drunken state based on a re-measurement result of the alcohol content.

According to the exemplary embodiments of the present disclosure, the alcohol interlock control apparatus and method may identify a driver based on the biosignal of the occupant seated in the driver's seat without an additional device and cost, and may fundamentally block improper alcohol measurement of an additional occupant instead of the driver.

DETAILED DESCRIPTION OF THE EMBODIMENTS

Figure 1:
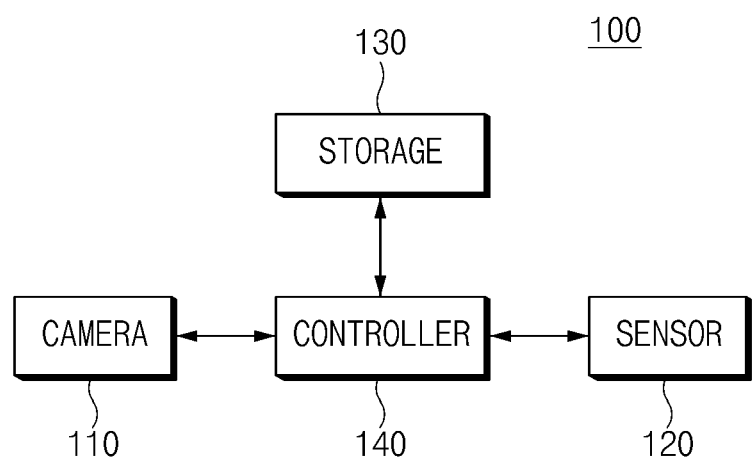
FIG. 1 illustrates a block diagram showing a configuration of an alcohol interlock control apparatus according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some exemplary embodiments of the present disclosure will be described in detail with reference to exemplary drawings. It should be noted that in adding reference numerals to constituent elements of each drawing, the same constituent elements have the same reference numerals as possible even though they are indicated on different drawings. In addition, in describing exemplary embodiments of the present disclosure, when it is determined that detailed descriptions of related well-known configurations or functions interfere with understanding of the exemplary embodiments of the present disclosure, the detailed descriptions thereof will be omitted.

In describing constituent elements according to an exemplary embodiment of the present disclosure, terms such as first, second, A, B, (a), and (b) may be used. These terms are only for distinguishing the constituent elements from other constituent elements, and the nature, sequences, or orders of the constituent elements are not limited by the terms. In addition, all terms used herein including technical scientific terms have the same meanings as those which are generally understood by those skilled in the technical field to which the present disclosure pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

FIG. 1 illustrates a block diagram showing a configuration of an alcohol interlock control apparatus according to an exemplary embodiment of the present disclosure.

As shown in FIG. 1, the alcohol interlock control apparatus 100 according to the exemplary embodiment of the present disclosure may include a camera 110, a sensor 120, a storage 130, and a controller 140.

The camera 110 may acquire an image of an occupant that boards a vehicle, and the camera 110 may be provided in a room mirror or cluster (see FIG. 3) according to an exemplary embodiment. The controller 140 may determine whether a driver is seated, whether the driver exhales, or whether the driver has changed, based on the occupant image acquired by the camera 110.

Figure 2:
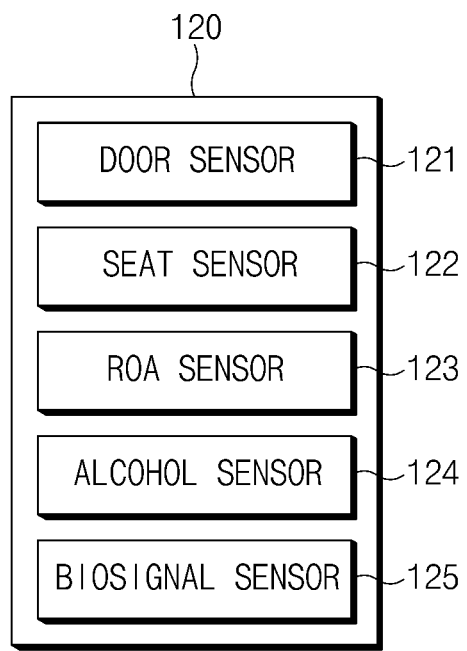
FIG. 2 illustrates a configuration of a sensor according to an exemplary embodiment of the present disclosure.
Figure 3:
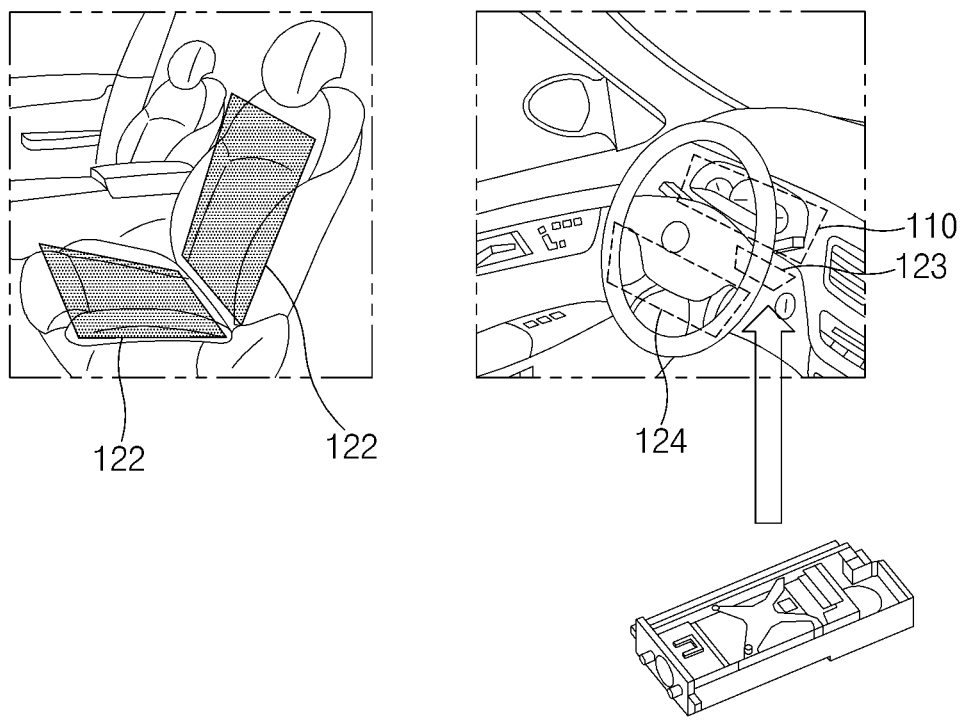
FIG. 3 schematically illustrates an alcohol interlock control apparatus provided in a vehicle according to an exemplary embodiment of the present disclosure.

The sensor 120 will be described with reference to FIG. 2 and FIG. 3. FIG. 2 illustrates a configuration of a sensor according to an exemplary embodiment of the present disclosure. FIG. 3 schematically illustrates an alcohol interlock control apparatus provided in a vehicle according to an exemplary embodiment of the present disclosure.

The sensor 120 may include a door sensor 121, a seat sensor 122, a rear occupant alert (ROA) sensor 123, an alcohol sensor 124, and a biosignal sensor 125 as illustrated in FIG. 2.

The door sensor 121 may sense opening or closing of a door of the vehicle, and the controller 140 may determine whether or not an occupant gets in or out of the vehicle based on information sensed by the door sensor 121. When the door sensor 121 senses opening or closing of a driver's seat door after the occupant is seated, the controller 140 may determine that the occupant seated in the driver's seat may be changed. In addition, when the door sensor 121 senses opening or closing of a door other than the driver's seat door, the controller 140 may determine that an additional occupant is on board.

The seat sensor 122 may sense whether the occupant is seated, and the controller 140 may determine which seat (driver's seat or passenger's seat) the occupant is seated based on information sensed by the seat sensor 122. According to an exemplary embodiment of the present disclosure, the seat sensor 122 may include a seat belt reminder (SBR).

The ROA sensor 123 may sense boarding of an additional occupant. According to an exemplary embodiment, the ROA sensor 123 may include an ultrasonic sensor and a radar sensor.

The alcohol sensor 124 may acquire an alcohol content based on an exhalation of the occupant seated in the driver's seat. The controller 140 may determine a drunken state of the occupant seated in the driver's seat based on the alcohol content sensed by the alcohol sensor 124.

The biometric signal sensor 125 may acquire a biosignal of the occupant seated in the driver's seat. The controller 140 may authenticate or confirm a driver based on the biosignal acquired by the biosignal sensor 125, and may determine a state of the driver. Herein, the biosignal may include an electrical signal generated by physical movement of a heart, that is, an electrocardiogram (ECG). According to the present exemplary embodiment, the biosignal sensor 125 may be provided anywhere, such as a steering wheel or a seat, which a body of the occupant may contact. A more detailed description of an electrocardiogram, which is the biosignal acquired by the biosignal sensor 125, will be described with reference to FIG. 4.

Although not illustrated, the sensor 125 may include a voice recognition sensor capable of recognizing voices of additional occupants excluding the occupant seated in the driver's seat.

Figure 4:
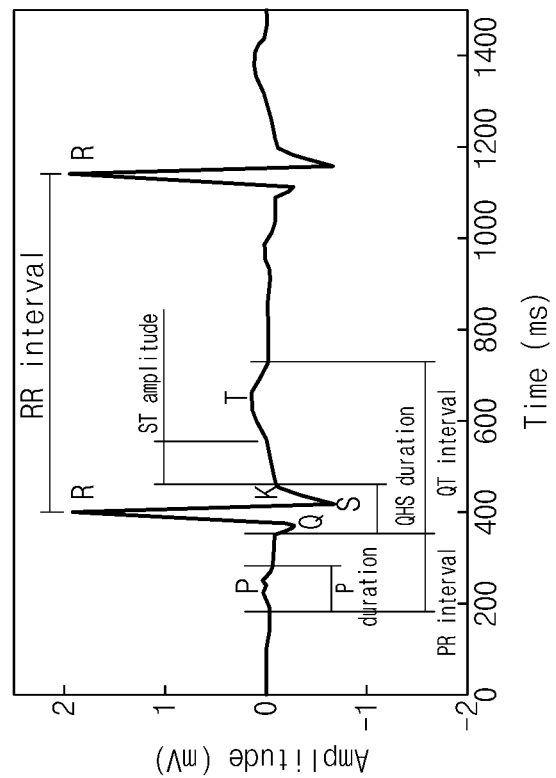
FIG. 4 illustrates a graph showing an electrocardiogram (ECG) waveform according to an exemplary embodiment of the present disclosure.
Figure 4:
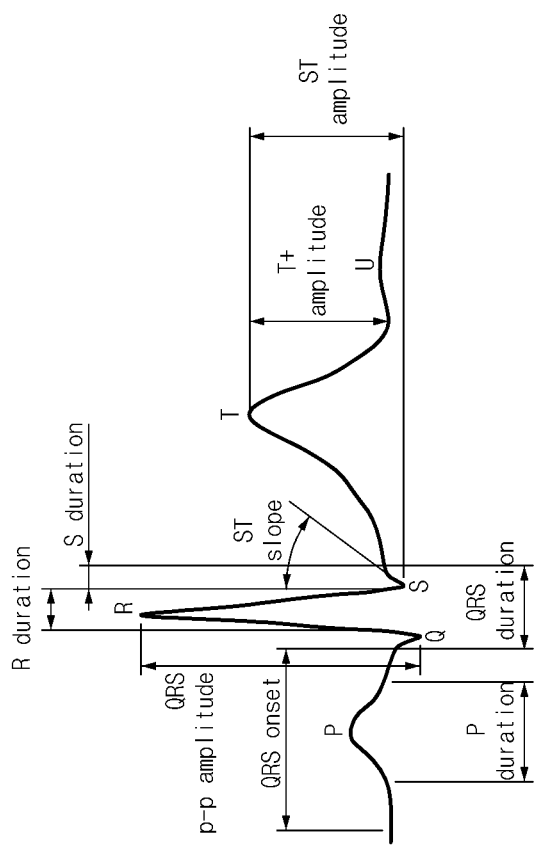

FIG. 4 illustrates a graph showing an electrocardiogram (ECG) waveform according to an exemplary embodiment of the present disclosure.

The heart includes a left ventricle, a right ventricle, a left atrium, and a right atrium, and electrical signals generated whenever each element is operated are as illustrated in FIG. 4. Since a QRS waveform and P and T waveforms have different shapes for each person and an RR interval also has a different value for each person, biosignals that each occupant has are different. Accordingly, the controller 140 may determine whether or not the occupant seated in the driver's seat has been changed based on the biosignals.

The storage 130 may store at least one algorithm that performs calculation or execution of various instructions for operations of the alcohol interlock control apparatus according to an exemplary embodiment of the present disclosure. The storage 130 includes at least of one storage medium of a flash memory, a hard disc, a memory card, a read-only memory (ROM), a random access memory (RAM), and an electrically erasable programmable read-only memory (EEPROM), a programmable read-only memory (PROM), a magnetic memory, a magnetic disk, and an optical disk.

The controller 140 may be implemented by various processing devices such as a microprocessor incorporating a semiconductor chip, etc., capable of performing calculation or execution of various instructions, and may control operations of the alcohol interlock control apparatus according to an exemplary embodiment of the present disclosure. Specifically, the controller 140 may determine whether or not an occupant seated in the driver's seat has been changed based on a biosignal of the occupant, and when changed, may determine whether the occupant is in the drunken state.

The controller 140 may determine whether an occupant is seated in the driver's seat. When it is determined that the occupant is seated in the driver's seat, the controller 140 acquires a biosignal of the occupant. When the biosignal of the occupant is acquired, the controller 140 may store it in the storage 130. Herein, the biosignal of the occupant stored in the storage 130 may be used as unique identification information of a driver.

Thereafter, the controller 140 may measure an alcohol content of the occupant, and may determine whether or not the occupant is in the drunken state based on the measured alcohol content. When it is determined that the occupant is in the drunken state, the controller 140 may control an interlock. Herein, the interlock may indicate a method of performing control such that a normal operation cannot be performed. As an example, the interlock may include an interlock that makes it impossible to start a vehicle.

On the other hand, when it is determined that the occupant is not in the drunken state, the controller 140 determines whether the occupant seated in the driver's seat has changed based on the biosignal of the occupant seated in the driver's seat. According to an exemplary embodiment, the controller 140 may determine that the occupant seated in the driver's seat has not changed when it is determined that the previously stored biosignal of the occupant and a biosignal of the occupant that is currently seated in the driver's seat are identical. On the other hand, the controller 140 may determine that the occupant seated in the driver's seat has changed when it is determined that the previously stored biosignal of the occupant and a biosignal of an occupant that is currently seated in the driver's seat are different.

The controller 140 may control an engine to be turned on when it is determined that the occupant seated in the driver's seat has not changed. However, when it is determined that the occupant seated in the driver's seat has changed, the controller 140 may re-measure the alcohol content of the occupant. As a result, when the occupant seated in the driver's seat has changed, the controller 140 may continuously determines whether a driver is in the drunken state by re-measurement of the alcohol content, thereby fundamentally blocking drunken driving by controlling the interlock when the driver is in the drunken state.

In addition, when it is determined that the occupant is seated in the driver's seat, the controller 140 determines whether an additional occupant is on board. In this case, when the door sensor 121 senses opening or closing of a door other than the driver's seat door, the controller 140 may determine that the additional occupant is on board.

When it is determined that the additional occupant is on board, the controller 140 may acquire a biosignal of the occupant and store it in the storage 130. In addition, alcohol contents of the occupants may be measured.

When it is determined that the additional occupant is not on board, the controller 140 may determine that only the occupant seated in the driver's seat is present in the vehicle, and may measure the alcohol content of the occupant. The controller 140 determines whether the occupant seated in the driver's seat is in the drunken state based on a measurement result of the alcohol content. When it is determined that the occupant seated in the driver's seat is in the drunken state, the controller 140 may control an interlock. On the other hand, when it is determined that the occupant seated in the driver's seat is not in the drunken state, the controller 140 may control the engine to be turned on.

The controller 140 may determine whether driving has started within a predetermined time after the engine is turned on, and when it is determined that the driving has started within the predetermined time, may control the driving to be maintained. Herein, the predetermined time may indicate a time required for an occupant seated in the driver's seat to get out of the vehicle and for an additional occupant to be seated in the driver's seat.

When it is determined that the driving has started after the predetermined time has elapsed after the engine is turned on, in the case that the additional occupant is on board, the controller 140 determines that it is likely that the occupant seated in the driver's seat gets out of the vehicle and the additional occupant is seated in the driver's seat, and may determine whether or not the occupant seated in the driver's seat has changed. According to an exemplary embodiment, the controller 140 may determine that the occupant seated in the driver's seat has not changed when it is determined that the previously stored biosignal of the occupant and a biosignal of the occupant that is currently seated in the driver's seat are identical. On the other hand, the controller 140 may determine that the occupant seated in the driver's seat has changed when it is determined that the previously stored biosignal of the occupant and a biosignal of an occupant that is currently seated in the driver's seat are different. When it is determined that the occupant seated in the driver's seat has changed, the controller 140 may re-measure the alcohol content of the occupant determined to have been changed. Accordingly, the present disclosure may fundamentally block the driving by the occupant seated in the driver's seat who is in the drunken state by allowing the controller 140 to re-measure the alcohol content of the occupant seated in the driver's seat even after the occupant is changed to determine the drinking state again. When it is determined that the occupant has not been changed, the controller 140 may control the driving to be started.

Meanwhile, when the driving is started after a predetermined time has elapsed and no additional occupant is on board, the controller 140 may control the driving to be started.

The controller 140 may continuously determine a drinking state of the occupant seated in the driver's seat even when the engine is turned on and the vehicle is running. According to an exemplary embodiment, the controller 140 may determine whether a condition for reconfirming the occupant seated in the driver's seat is satisfied when it is in a running state after the engine is turned on.

According to an exemplary embodiment of the present disclosure, when a predetermined time has elapsed, the controller 140 may determine that the condition for reconfirming the occupant seated in the driver's seat is satisfied, and when a situation that is similar to the drunken state is determined based on a driver state acquired through the camera 110, the controller 140 may determine that the condition for reconfirming the occupant seated in the driver's seat is satisfied. In addition, when a vehicle departs after stopping for a predetermined time (e.g., when departing after being maintained for 5 min or more at a speed of 0 km/h), the controller 140 may determine that the condition for reconfirmation of the occupant seated in the driver's seat is satisfied. In addition, when it is determined that movement of the additional occupant or a seating position has changed based on information sensed by the sensor 120, the controller 140 may determine that the condition for reconfirming the occupant seated in the driver's seat is satisfied. For example, the controller 140 may sense movement of an additional occupant based on whether a driver side door or a passenger side door is opened or closed, and may sense the movement of the additional occupant based on the SBR sensor or the ROA sensor. In addition, when a voice other than a voice of the occupant seated in the driver's seat or a face image of a different form is sensed, the controller 140 may determine that there is movement of the additional occupant or that the seating position is changed.

When it is determined that the condition for reconfirming the occupant is satisfied, the controller 140 may control a biosignal of the occupant seated in the driver's seat to be re-measured. The controller 140 may compare the re-measured biosignal of the occupant with the biosignal of the occupant stored before driving.

The controller 140 may determine whether the occupant seated in the driver's seat has changed based on a result of comparing the re-measured biosignal of the occupant with the biosignal of the occupant stored before driving. When it is determined that the re-measured biosignal of the occupant and the biosignal of the occupant stored before driving are different, the controller 140 may determine that the occupant seated in the driver's seat has changed, whereas when it is determined that the re-measured biosignal of the occupant and the biosignal of the occupant stored before driving are the same, the controller may determine that the occupant seated in the driver's seat has not changed.

When it is determined that the occupant seated in the driver's seat has changed, the controller 140 may control the alcohol content of the occupant to be re-measured. The controller 140 may control the interlock when it is determined that the occupant seated in the driver's seat is in a drunken state based on a re-measurement result of the alcohol content, or when a number of times of unmeasured alcohol content of the occupant exceeds a predetermined number. On the other hand, the controller 140 may control driving of the vehicle to be maintained when it is determined that the occupant seated in the driver's seat has not changed.

When it is determined that the occupant seated in the driver's seat is not in the drunken state based on a re-measurement result of the alcohol content, the controller 140 may determine that a new occupant is seated in the driver's seat, and may update driver information based on the re-measured biosignal signal.

Figure 5:
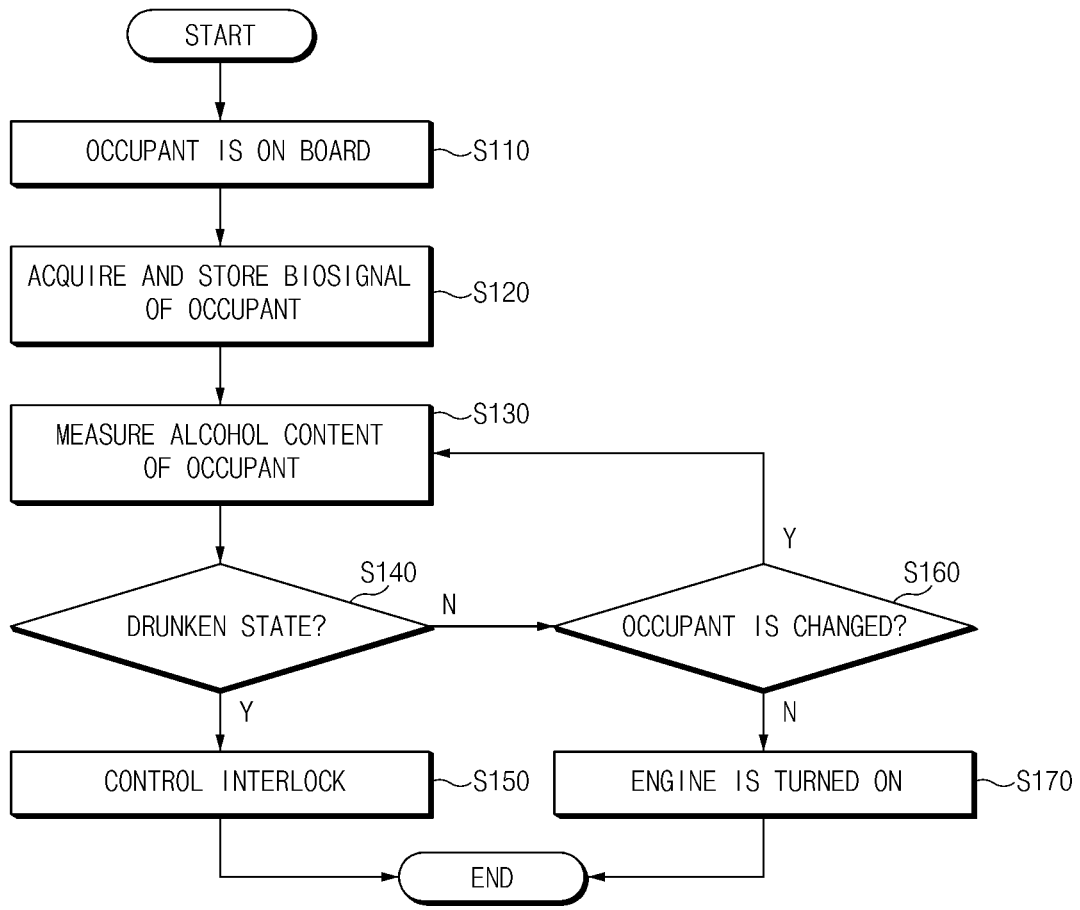
FIG. 5 illustrates a flowchart showing an alcohol interlock control method according to an exemplary embodiment of the present disclosure.

FIG. 5 illustrates a flowchart showing an alcohol interlock control method according to an exemplary embodiment of the present disclosure.

As illustrated in FIG. 5, the controller 140 determines whether or not an occupant is seated in the driver's seat (S110). When it is determined that the occupant is seated in the driver's seat, the controller 140 acquires and stores a biosignal of the occupant (S120). Herein, the biosignal of the occupant stored in the storage 130 may be used as unique identification information of a driver. Thereafter, the controller 140 may measure an alcohol content of the occupant (S130). It is determined whether the occupant is in a drunken state based on the alcohol content measured in step S130 (S140).

In step S140, when it is determined that the occupant is in the drunken state (Y), the controller 140 may control an interlock (S150). On the other hand, when it is determined that the occupant is not in the drunken state in step S140, the controller 140 determines whether the occupant seated in the driver's seat has changed based on the biosignal of the occupant seated in the driver's seat (S160).

According to an exemplary embodiment, the controller 140 may determine that the occupant seated in the driver's seat has not changed when it is determined that the previously stored biosignal of the occupant and a biosignal of the occupant that is currently seated in the driver's seat are identical in step S160. On the other hand, the controller 140 may determine that the occupant seated in the driver's seat has changed when it is determined that the previously stored biosignal of the occupant and a biosignal of an occupant that is currently seated in the driver's seat are different.

When it is determined that the occupant seated in the driver's seat has not changed (N) in step S160, the controller 140 may control an engine to be turned on (S170). However, when it is determined that the occupant seated in the driver's seat has changed in step S160, the controller 140 may be allowed to re-measure the alcohol content of the occupant (S130). As a result, when the occupant seated in the driver's seat has changed, the controller 140 may continuously determines whether a driver is in the drunken state by re-measurement of the alcohol content, thereby fundamentally blocking drunken driving by controlling the interlock when the driver is in the drunken state.

Figure 6:
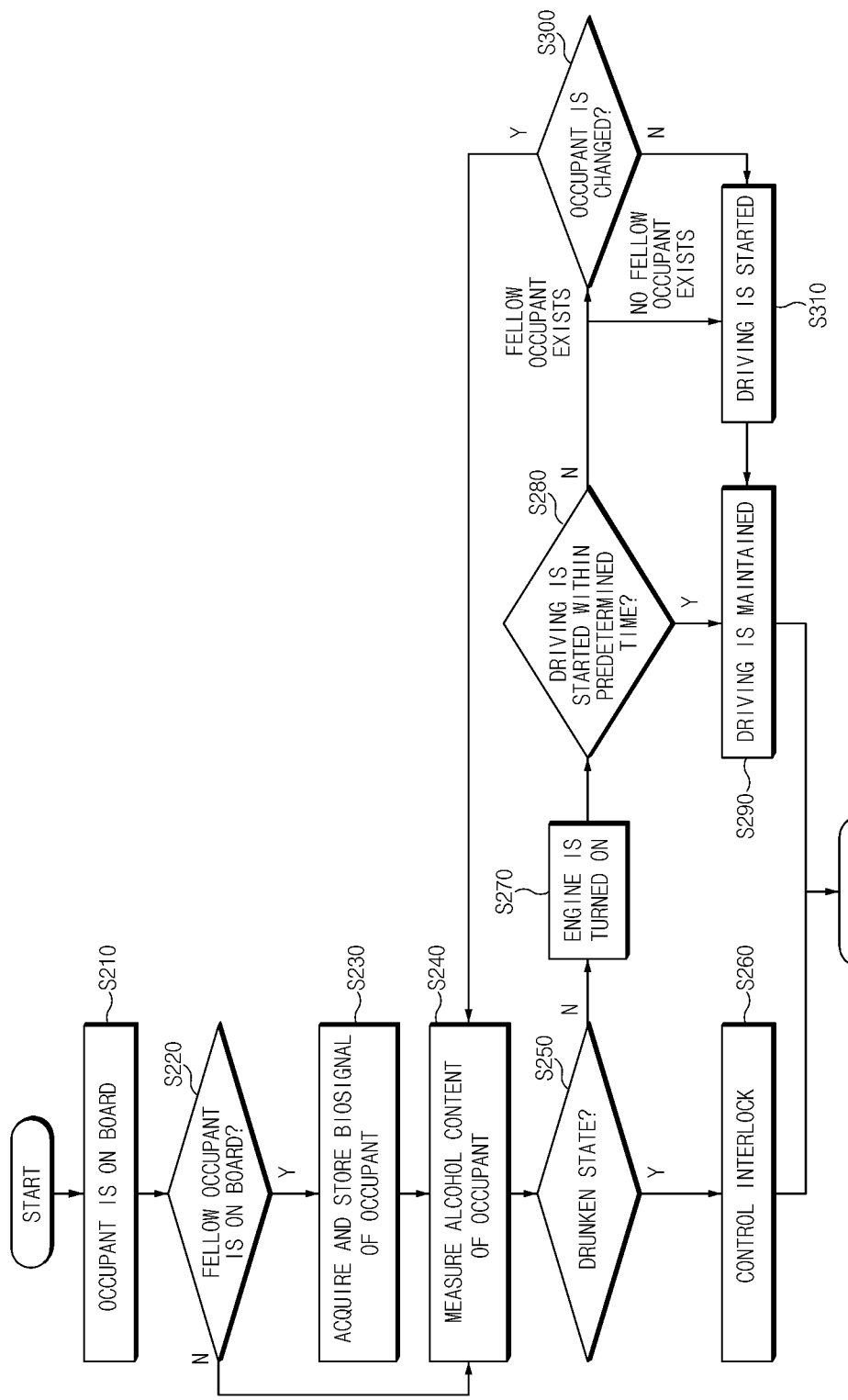
FIG. 6 illustrates a flowchart showing an alcohol interlock control method according to another exemplary embodiment of the present disclosure.

FIG. 6 illustrates a flowchart showing an alcohol interlock control method according to another exemplary embodiment of the present disclosure.

As illustrated in FIG. 6, when it is determined that an occupant is seated in the driver's seat (S210), the controller 140 determines whether an additional occupant is seated (S220). When the door sensor 121 senses opening or closing of a door other than the driver's seat door in step S220, the controller 140 may determine that the additional occupant is on board.

When it is determined that the additional occupant is on board (Y) in step S220, the controller 140 may acquire and store a biosignal of the occupant (S230). In addition, alcohol contents of the occupants may be measured (S240). On the other hand, when it is determined that the additional occupant is not on board (N) in step S220, the controller 140 may determine that only the occupant seated in the driver's seat is present in the vehicle, and may measure the alcohol content of the occupant (S240).

The controller 140 determines whether the occupant seated in the driver's seat is in a drunken state based on a measurement result of the alcohol content acquired in step S240 (S250). When it is determined that the occupant is in the drunken state (Y) in step S250, the controller 140 may control an interlock (S260). Meanwhile, when it is determined that the occupant seated in the driver's seat is not in the drunken state in step S260, the controller 140 may control the engine to be turned on (S270).

The controller 140 may determine whether or not driving has started within a predetermined time after the engine is turned on (S280). Herein, the predetermined time may indicate a time required for an occupant seated in the driver's seat to get out of the vehicle and for an additional occupant to be seated in the driver's seat.

When it is determined that driving has started within the predetermined time (Y), the controller 140 may control the driving to be maintained (S290). When it is determined that the driving has started after the predetermined time has elapsed after the engine is turned on (N) in step S280, in the case that the additional occupant is on board, the controller 140 determines that it is likely that the occupant seated in the driver's seat gets out of the vehicle and the additional occupant is seated in the driver's seat, and may determine whether or not the occupant seated in the driver's seat has changed (S300).

According to an exemplary embodiment, when it is determined that the previously stored biosignal of the occupant and a biosignal of the occupant that is currently seated in the driver's seat are identical in step S300, the controller 140 may determine that the occupant seated in the driver's seat has not changed (N). On the other hand, when it is determined that the previously stored biosignal of the occupant and a biosignal of an occupant that is currently seated in the driver's seat are different in step S300, the controller 140 may determine that the occupant seated in the driver's seat has changed (Y). When it is determined that the occupant seated in the driver's seat has changed, the controller 140 may re-measure the alcohol content of the occupant determined to have been changed (S240). Accordingly, the present disclosure may fundamentally block the driving by the occupant seated in the driver's seat who is in the drunken state by allowing the controller 140 to re-measure the alcohol content of the occupant seated in the driver's seat even after the occupant is changed to determine the drinking state again. When it is determined that the occupant has not been changed in step S300, the controller 140 may control the driving to be started (S130).

Meanwhile, when the driving is started after a predetermined time has elapsed and no additional occupant is on board in step S280, the controller 140 may control the driving to be started (S310).

Figure 7:
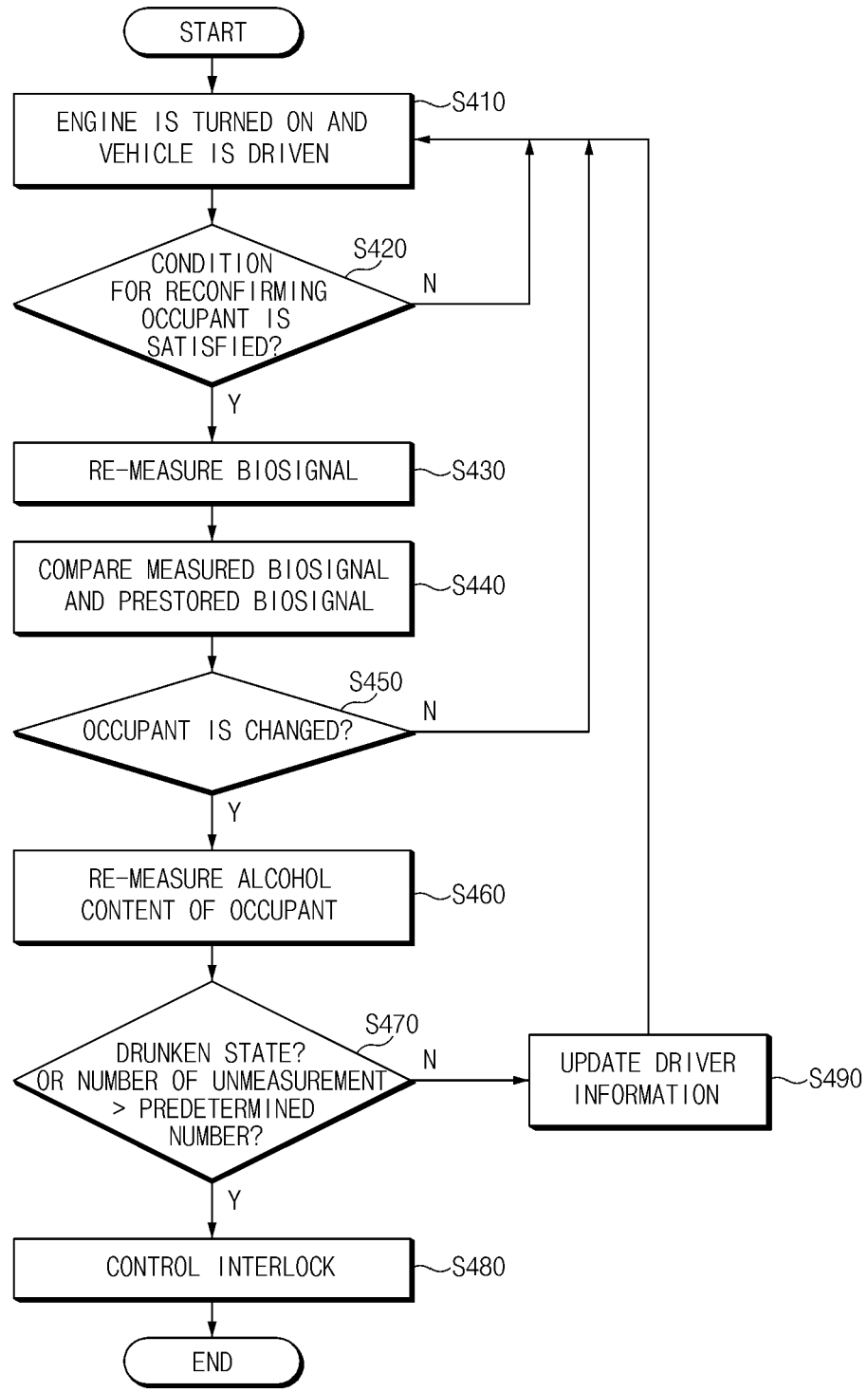
FIG. 7 illustrates a flowchart showing an alcohol interlock control method according to yet another exemplary embodiment of the present disclosure.

FIG. 7 illustrates a flowchart showing an alcohol interlock control method according to yet another exemplary embodiment of the present disclosure.

The controller 140 may continuously determine a drinking state of the occupant seated in the driver's seat even when the engine is turned on and the vehicle is running (S410). The controller 140 may determine whether a condition for reconfirming the occupant seated in the driver's seat is satisfied when it is in a running state after the engine is turned on (S420).

According to an exemplary embodiment of the present disclosure, when a predetermined time has elapsed, the controller 140 may determine that the condition for reconfirming the occupant seated in the driver's seat is satisfied in step S420, and when a situation that is similar to the drunken state is determined based on a driver state acquired through the camera 110, the controller 140 may determine that the condition for reconfirming the occupant seated in the driver's seat is satisfied. In addition, when a vehicle departs after stopping for a predetermined time (e.g., when departing after being maintained for 5 min or more at a speed of 0 km/h), it may be determined that the condition for reconfirmation of the occupant seated in the driver's seat is satisfied. In addition, when it is determined that movement of the additional occupant or a seating position has changed based on information sensed by the sensor 120, the controller 140 may determine that the condition for reconfirming the occupant seated in the driver's seat is satisfied. For example, the controller 140 may sense movement of an additional occupant based on whether a driver side door or a passenger side door is opened or closed, and may sense the movement of the additional occupant based on the SBR sensor or the ROA sensor. In addition, when a voice other than the voice of the occupant seated in the driver's seat or a face image of a different form is sensed, the controller 140 may determine that there is a movement of the additional occupant or the seating position has changed.

When it is determined that the condition for reconfirming the occupant is satisfied (Y) in step S420, the controller 140 may control a biosignal of the occupant seated in the driver's seat to be re-measured. The controller 140 may compare the re-measured biosignal of the occupant of step S430 with the biosignal of the occupant stored before driving (S440).

The controller 140 may determine whether the occupant in the driver's seat has changed based on a result of comparing the re-measured biosignal of the occupant with the biosignal of the occupant stored before driving in step S440 (S450).

When it is determined that the re-measured biosignal of the occupant and the biosignal of the occupant stored before driving are different in step S450, the controller 140 may determine that the occupant seated in the driver's seat has changed (Y), whereas when it is determined that the re-measured biosignal of the occupant and the biosignal of the occupant stored before driving are the same, the controller may determine that the occupant seated in the driver's seat has not changed (N).

When it is determined that the occupant seated in the driver's seat has changed (Y), the controller 140 may control the alcohol content of the occupant to be re-measured (S460). On the other hand, when it is determined that the occupant seated in the driver's seat has not changed in step S470, the controller 140 may control driving of the vehicle to be maintained (S410).

The controller 140 may determine whether the occupant is in the drunken state based on a re-measurement result of the alcohol content in step S460, or when a number of times of an unmeasured alcohol content of the occupant exceeds a predetermined number (S470).

When it is determined that the occupant is in the drunken state, or the number of times of the unmeasured alcohol content of the occupant exceeds the predetermined number (Y) in step S470, the controller 140 may control the interlock (S480). In step S480, when it is determined that the occupant seated in the driver's seat is not in the drunken state based on a re-measurement result of the alcohol content (Y), the controller 140 may determine that a new occupant is seated in the driver's seat, and may update driver information based on the re-measured biosignal signal.

Figure 8:
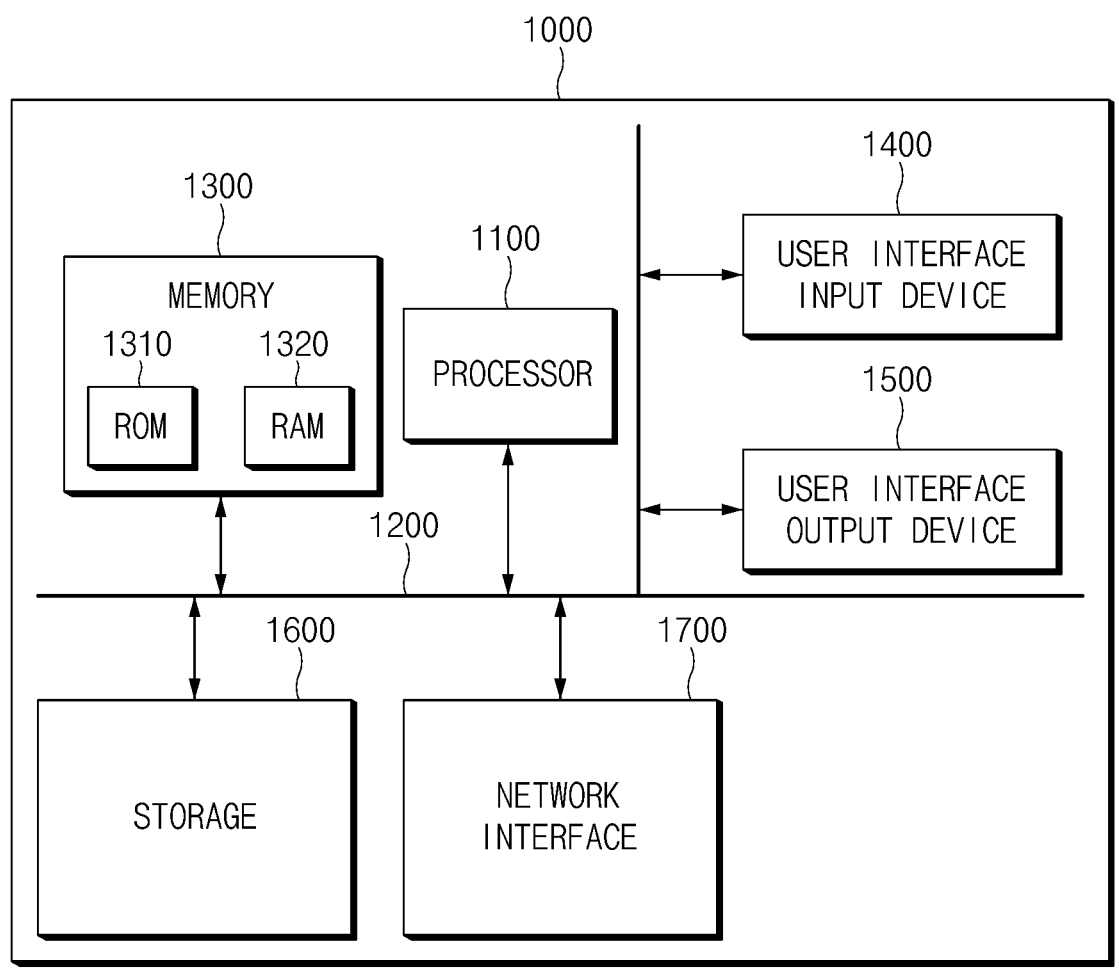
FIG. 8 illustrates a configuration of a computing system that executes a method according to an exemplary embodiment of the present disclosure.

FIG. 8 illustrates a configuration of a computing system that executes a method according to an exemplary embodiment of the present disclosure.

Referring to FIG. 8, the computing system 1000 includes at least one processor 1100 connected through a bus 1200, a memory 1300, a user interface input device 1400, a user interface output device 1500, and a storage 1600, and a network interface 1700.

The processor 1100 may be a central processing unit (CPU) or a semiconductor device that performs processing on commands stored in the memory 1300 and/or the storage 1600. The memory 1300 and the storage 1600 may include various types of volatile or nonvolatile storage media. For example, the memory 1300 may include a read only memory (ROM) 1310 and a random access memory (RAM) 1320.

Accordingly, steps of a method or algorithm described in connection with the exemplary embodiments disclosed herein may be directly implemented by hardware, a software module, or a combination of the two, executed by the processor 1100. The software module may reside in a storage medium (i.e., the memory 1300 and/or the storage 1600) such as a RAM memory, a flash memory, a ROM memory, a EPROM memory, a EEPROM memory, a register, a hard disk, a removable disk, and a CD-ROM. An exemplary storage medium is coupled to the processor 1100, which can read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

The above description is merely illustrative of the technical idea of the present disclosure, and those skilled in the art to which the present disclosure pertains may make various modifications and variations without departing from the essential characteristics of the present disclosure.

Therefore, the exemplary embodiments disclosed in the present disclosure are not intended to limit the technical ideas of the present disclosure, but to explain them, and the scope of the technical ideas of the present disclosure is not limited by these exemplary embodiments. The protection range of the present disclosure should be interpreted by the claims below, and all technical ideas within the equivalent range should be interpreted as being included in the scope of the present disclosure.

What is claimed is:

1. An alcohol interlock control apparatus for a vehicle, comprising:
   a sensor configured to acquire a biosignal of an occupant that is seated in a driver's seat; and
   a controller configured to:
     determine whether or not the occupant seated in the driver's seat has changed based on the biosignal of the occupant, and when changed, to determine whether the changed occupant is in a drunken state;
     control an engine to be turned on when the occupant seated in the driver's seat is in the non-drunken state;
     determine whether driving has started within a predetermined time after the engine is turned on; and
     determine whethere the occupant seated in the driver's seat has changed when driving has started after the predetermined time has elapsed after the engine is turned on.

2. The alcohol interlock control apparatus of claim 1, wherein the controller measures an alcohol content of the occupant when the biosignal of the occupant is acquired, and determines whether or not the occupant is in the drunken state based on the measured alcohol content.

3. The alcohol interlock control apparatus of claim 2, wherein the controller determines whether the occupant seated in the driver's seat has changed when it is determined that the occupant is in a non-drunken state.

4. The alcohol interlock control apparatus of claim wherein the controller controls the vehicle to start driving when the occupant seated in the driver's seat is not changed.

5. The alcohol interlock control apparatus of claim 4, wherein the controller determines whether a condition for reconfirming the occupant seated in the driver's seat is satisfied after the vehicle starts driving and when satisfied, controls the biosignal of the occupant seated in the driver's seat to be re-measured.

6. The alcohol interlock control apparatus of claim 5, wherein the controller compares the biosignal of the occupant seated in the driver's seat with a biosignal of an occupant previously stored, and when they are different based on a comparison result thereof, determines that the occupant seated in the driver's seat has changed, and controls the alcohol content of the occupant seated in the driver's seat to be re-measured.

7. The alcohol interlock control apparatus of claim 6, wherein the controller controls an interlock when it is determined that the occupant is in the drunken state based on a re-measurement result of the alcohol content.

8. The alcohol interlock control apparatus of claim 6, wherein the controller updates driver information based on the re-measured biosignal of the occupant when it is determined that the occupant is not in the drunken state based on a re-measurement result of the alcohol content.

9. An alcohol interlock control method comprising:
acquiring, by a sensor, a biosignal of an occupant that is seated in a driver's seat; and
determining, by a controller, whether or not the occupant seated in the driver's seat has changed based on the biosignal of the occupant, and when changed, determining whether the changed occupant is in a drunken state,
control, by the controller, an engine to be turned when the occupant seated in the driver's seat is in the non-drunken state;
determined, by the controller, whether driving has started within the predetermined time after the engine is turned on; and
determine, by the controller, whether the occupant seated in the driver's seat has changed when driving has started after the predetermined time has elapsed after the engine is turned on.

10. The alcohol interlock control method of claim 9, further comprising:
measuring an alcohol content of the occupant when the biosignal of the occupant is acquired, and determining whether or not the occupant is in the drunken state based on the measured alcohol content.

11. The alcohol interlock control method of claim 10, wherein whether the occupant seated in the driver's seat has changed is determined when it is determined that the occupant is not in the drunken state.

12. The alcohol interlock control method of claim 9 wherein a vehicle is controlled to start driving when the occupant seated in the driver's seat is not changed.

13. The alcohol interlock control method of claim 12, wherein whether a condition for reconfirming the occupant seated in the driver's seat is satisfied is determined after the vehicle starts driving and when satisfied, the biosignal of the occupant seated in the driver's seat is controlled to be re-measured.

14. The alcohol interlock control method of claim 13, wherein the biosignal of the occupant seated in the driver's seat is compared with a biosignal of an occupant previously stored, when they are different based on a comparison result thereof, it is determined that the occupant seated in the driver's seat has changed, and the alcohol content of the occupant seated in the driver's seat is controlled to be re-measured.

15. The alcohol interlock control method of claim 14, wherein an interlock is controlled when it is determined that the occupant is in the drunken state based on a re-measurement result of the alcohol content.

16. The alcohol interlock control method of claim 14, wherein driver information is updated based on the re-measured biosignal of the occupant when it is determined that the occupant is not in the drunken state based on a re-measurement result of the alcohol content.

* * * * *